3,074,895
COATING COMPOSITIONS CONTAINING WATER-INSOLUBLE FERRIC POLYPHOSPHATE PIGMENTS
Julius Jackson, Westfield, N.J., assignor to E. I. du Pont de Nemours and Company, Wilmington, Del., a corporation of Delaware
No Drawing. Filed June 29, 1955, Ser. No. 518,945
2 Claims. (Cl. 260—22)

This invention relates to coating compositions of improved durability resulting from the incorporation of a ferric polyphosphate as an essential pigmenting ingredient in conventional coating composition vehicles.

It has long been recognized that pigmentation influences the durability of coating compositions in actual use. In general, it may be said that pigmented films of organic film-forming compositions are more resistant to destruction on exposure to light and to the elements than are films which contain no pigment. Unfortunately, this is not true of all pigments, and it sometimes happens that pigments which are desirable from the decorative point of view do not enhance the protective value of the film and may actually detract therefrom.

It is also well known in this art that the degree of pigmentation markedly influences the properties of the film. It is very often the case that the optimum pigmentation for maximum durability greatly exceeds that necessary for desirable decorative effects. This is especially true in the case of a very common type of semi-transparent automotive finishes which, when also pigmented with flake aluminum, exhibit a high degree of flash and two-tone effect. Nearly all colored pigments, when used in sufficient amount to give optimum durability, impart substantial opacity to the film, thus inhibiting this desirable flash and two-tone effect.

It is also true that many of the durable colored pigments are high in cost, and when used in the amount required for optimum durability, result in compositions of objectionably high cost.

Thus, there has been a great need for a pigment which can be used to enhance the outdoor durability of organic coatings while imparting a minimum of color and opacity to the film. Such a product would permit maximum flexibility in the formulation of coating compositions in that another desired pigment could be used to obtain predetermined decorative effects while the new pigment would be used to enhance the durability of the film. It would even be possible with such a pigment to formulate a substantially clear varnish exhibiting a degree of outdoor durability comparable to that of the best pigmented films.

The pigments used in this invention to impart the desirable properties listed above to a coating composition comprise ferric polyphosphates, such as ferric pyrophosphate, obtained by the reaction of a ferric salt with tetrasodium pyrophosphate.

It is an object of this invention to provide coating compositions of improved durability on exposure to the elements. It is a further object to provide such coating compositions which are substantially free of either color or opacity and are capable of being used as clear varnishes while, at the same time, exhibiting the superior durability usually associated with the colored and opaque films of pigmented coating compositions.

The objects of this invention are accomplished by the preparation of coating compositions comprising conventional organic film-forming vehicles pigmented with a ferric polyphosphate. The compositions may also include other pigments such as colored pigments or metallic flake pigments which have been added to impart specific properties to the film.

In the preferred embodiment of this invention a ferric pyrophosphate pigment is prepared by adding a solution of tetrasodium pyrophosphate to a solution of ferric sulphate in substantially stoichiometric proportions followed by heat development, filtration and isolation in a conventional manner. The resulting powder is almost white, with a slightly brownish cast, and it may be dispersed in any conventional coating composition vehicle by any well known dispersing or grinding technique commonly practiced in the manufacture of pigmented coating compositions. When the ferric pyrophosphate is the sole pigmenting ingredient, the composition is substantially colorless and substantially transparent. When it is added in conjunction with a colored pigment, the resulting composition has substantially the color of the second pigment even though it may contain substantial amounts of the ferric pyrophosphate.

The following examples illustrate this invention in more detail.

Example 1

278 parts of copperas ($FeSO_4 \cdot 7H_2O$) is dissolved in 1,000 parts of water to which is added 49 parts of $H_2SO_4$ (100%). A solution of 18.6 parts of sodium chlorate in 200 parts of water is then added thereto. The solution thus obtained is heated to about 82° C. and held at that temperature for approximately one-half hour to oxidize all of the iron to the ferric state, and the solution is then diluted with water to a total volume equivalent to about 3,000 parts and the temperature adjusted to 82° C. A solution of 190 parts of tetrasodium pyrophosphate ($Na_4P_2O_7$) in 2,500 parts of water is adjusted to a temperature of about 50° C. and added rapidly to the solution of ferric sulphate. The slurry is then heated to a temperature of about 82° C. and held at that temperature for about one hour. After the completion of this step which is know as heat development, the pH should be 1.7 to 1.8. The precipitate is then isolated by filtration, washed free of soluble salts, and dried at about 60° C. to give about 246 parts of a nearly white powder showing a slight brownish color.

Analyses of typical samples made in this manner invariably show the presence of appreciable amounts of sodium which may vary from about 0.5% to as much as nearly 2%. At the same time, the analyses show a deficiency of pyrophosphate ion in comparison to the theoretical ferric pyrophosphate molecule of $Fe_4(P_2O_7)_3$. It is suggested in the prior art that the actual composition of these pyrophosphates is a solid solution of tetrasodium pyrophosphate in ferric pyrophosphate, which varies to some extent in composition as the amounts of reactants and the conditions are varied.

Example 2

The process of Example 1 is repeated exactly except the 219 parts of an acid potassium pyrophosphate ($K_3HP_2O_7$) is used instead of the tetrasodium pyrophosphate of Example 1. The resulting product comprises 235 parts of a nearly colorless powder which is substantially like the product of Example 1 except that it is the potassium analogue.

Example 3

This example shows the preparation of a ferric tri-polyphosphate and the process is substantially like that of Example 1 except that the phosphate compound used comprises 210 parts of sodium tri-polyphosphate ($Na_5P_3O_{10}$). The resulting product comprises 248 parts of a substantially colorless powder whch can be used to make highly transparent coating compositions.

Example 4

A clear enamel coating composition is prepared comprising the following ingredients:

| | Parts |
|---|---|
| Pigment of Example 1 | 15 |
| Short oil alkyd resin (60% solids in xylol) (38% soya-oil) | 216 |
| Butylated melamine formaldehyde resin (60% solids in butanol-xylol) | 20 |
| Aromatic hydrocarbon solvent (xylol) | 40 |
| Aliphatic hydrocarbon solvent (VM & P naphtha) | 40 |
| Manganese naphthanate drier | 0.2 |

This composition may be prepared in any convenient manner. One frequently used procedure is to grind the pigment with a portion of the resin and with sufficient solvent to give a suitable consistency in a ball mill. When a suitable state of fineness is achieved (usually about 72 hours is sufficient), the mill is discharged and the balance of the ingredients are incorporated by simple mixing to give a relatively transparent varnish substantially free from color. A steel panel coated with this clear varnish shows substantially no change in color, or gloss, or integrity of the film after exposure to the elements on a 45° south location for 12 months. In contrast, a steel panel coated with the same enamel vehicle in the absence of any pigment shows blistering after about 3 months under the same conditions of exposure and is badly checked at the end of 12 months.

Example 5

A composition similar to that of Example 4 contains the same vehicles and thinners but uses:

| | Parts |
|---|---|
| Pigment of Example 1 | 15 |
| Aluminum flake | 0.75 |

This composition is a gray metallic enamel, and shows the same excellent durability as the composition of Example 4. It is far superior to a similar enamel from which the new pigment is omitted.

Example 6

A yellow enamel comprises the following ingredients:

| | Parts |
|---|---|
| Nickel complex of azo dye, p-chloraniline→dihydroxyquinoline | 7 |
| Pigment of Example 1 | 13 |
| Short oil alkyd resin (50% solids) | 216 |
| Modified melamine formaldehyde resin (60% solids) | 20 |
| Aromatic hydrocarbon solvent | 40 |
| Aliphatic hydrocarbon solvent | 40 |
| Manganese naphthanate drier | 0.2 |

This composition may be prepared in any well known manner, such as that suggested in Example 4, to give a greenish-yellow enamel of good hiding power and showing. After 12 months' exposure it possesses good gloss retention, and good color retention. Furthermore, the panels are substantially free of any evidence of film disintegration. Omission of the pigment of Example 1 from this enamel results in a film of similar color, but markedly inferior durability.

Example 7

A metallized maroon enamel composition uses the same vehicles and thinners as in Example 6 with the following pigmentation:

| | Parts |
|---|---|
| Copper complex of the azo dye, 4-nitroanthranilic acid→p-anisidide of 3-hydroxy 2-naphthoic acid | 5 |
| Aluminum flake | 0.15 |
| Pigment of Example 1 | 15 |

The resulting maroon enamel shows excellent hiding power and good durability after 12 months' exposure to the elements. Omission of the pigment of Example 1 from this enamel results in a film of similar color, but it is significantly inferior in durability.

Example 8

A substantially clear nitrocellulose lacquer of the following composition may be prepared in any well known manner:

| | Parts |
|---|---|
| Pigment of Example 1 | 23.1 |
| Cellulose nitrate (¼ sec.) | 79.3 |
| Non-drying alkyd resin (60% solids) | 60.8 |
| Dibutyl phthalate | 20.1 |
| Castor oil | 13.8 |
| Active solvents | 184.2 |
| Alcohols | 55.8 |
| Aromatic hydrocarbons | 77.3 |

On exposure to the elements, the panel coated with a film of this lacquer shows much less discoloration and much better gloss retention than a similar panel coated with an unpigmented portion of the same lacquer vehicle. The cracking and checking which is observed in the unpigmented clear vehicle is completely missing in the pigmented vehicle.

Example 9

A gray metallized nitrocellulose lacquer is made as in Example 8 except that the pigmentation comprises:

| | Parts |
|---|---|
| Pigment of Example 1 | 22 |
| Aluminum powder | 1.1 |

The exact method of dispersing pigments in such lacquer compositions is not critical, but a commonly used method is to grind the pigments in a ball mill or other grinding device with the resin-plasticizer portion of the final mixture together with a sufficient amount of solvent to give a suitable working consistency. The remaining ingredients are then incorporated with simple agitation to give a homogeneous product. It is common practice, though not critical, to add the aluminum powder at this point in the form of a paste containing an inert hydrocarbon solvent. The resulting metallized lacquer exhibits excellent durability and substantial freedom from chalking on exposure to the elements. Omission of the pigment of Example 1 gives a lacquer of inferior durability.

Example 10

A clear alkyd enamel was made as in Example 4 except that the pigment of Example 3 was used instead of the pigment of Example 1.

The resulting composition appears slightly more transparent than even the composition of Example 4 and shows slightly less color change and slightly better gloss retention than the composition of Example 4 after six months' exposure to the elements.

The preferred pigments of this invention are ferric polyphosphates made by the reaction of ferric salts with alkali polyphosphates. The preferred ferric salt for use in making these pigments is ferric sulphate which is readily obtained by oxidation of the very cheap ferrous sulphate (copperas) commonly available as a by-product in many operations. It is relatively easy to carry out this oxidation in solution and then to use the resulting solution directly in the subsequent precipitation. It is not, however, necessary to operate in this manner, and separately prepared ferric sulphate can be used. Furthermore, any common ferric salt, which may be available, will serve the same purpose, for instance, ferric chloride or ferric nitrate.

The preferred alkali phosphate in the reaction is tetrasodium pyrophosphate which is the sodium salt of the simplest polyphosphoric acid. Other polyphosphoric acids may be used in the form of their alkali salts such as sodium tri-polyphosphate. Furthermore, other alkali metals may be used in place of the sodium; for instance, Example 2 shows the use of the potassium acid pyrophosphate.

The relative amounts of the two reactants may vary over a rather wide range without significant effect upon the properties of the compositions made from these products as pigments. The preferred composition of Example 1 uses very slightly less than the theoretical quantity of tetrasodium pyrophosphate (actually 1 mol of iron to 0.714 mol of pyrophosphate instead of the theoretical 0.75 mol). Compositions have been made in which the relative amount of phosphate was varied from about 0.65 to about 0.9 mol per mol of iron without significant variation in the effects imparted to the coating compositions containing them.

Differences in the reaction procedure give products which seem to differ somewhat in the gloss retention of the resulting coating compositions. Thus, it appears that the heat development step results in products of improved gloss retention. Likewise, the addition of the phosphate to the iron solution seems to give slightly better products, although the reverse procedure (iron into phosphate) can be used.

The formulation of coating compositions of optimum durability depends on many factors. However, it is generally recognized that the durability of a coating composition film is markedly influenced by its pigmenation and that there is an optimum pigmentation for maximum durability. Speaking very generally, it may be said that films of optimum durability have a total pigment to binder (vehicle solids) weight ratio of at least 10%, usually in the range of 15 to 25% and rarely exceeding 40%. On the other hand, with many colored pigments, a pigment to binder ratio of about 5% satisfies the color and hiding power requirements from a purely decorative point of view. The ferric polyphosphates of this invention may be used to supplement this minimum amount of colored pigment to obtain the desired optimum degree of total pigmentation. In the case of clear finishes, the new pigment may be used as the sole pigmenting agent which imparts durabiilty to the film without imparting either significant amounts of color or of opacity thereto.

Within the limits of these considerations, the amount of the ferric polyphosphate pigment may vary widely depending upon the conditions under which it may be used. When used effectively, it should comprise in volume not less than about 5% of the total volume of the dry film even when it comprises the sole pigmenting ingredient in clear enamels. On the other hand, it may be used in amounts up to about 30% with the optimum figure in the range of 10 to 20%.

On a weight basis the amount of the ferric polyphosphate in the coating composition should be in the range of about 2 to about 50 parts by weight for 100 parts of organic film-forming material (i.e., vehicle solids). The preferred range is about 10 to about 20 parts.

The method by which the pigment is dispersed in the vehicle is not critical. Many well known methods are suitable including grinding in a ball mill, grinding on a three roll ink mill, and various forms of plastic milling. The only requirement is that the method effectively disperse the pigment in the vehicle to such a degree that the final film is free from any appearance of grit.

The organic film-forming materials of the working examples include oil modified alkyds designed to be finished by either baking or by air drying, and cellulose nitrate. However, it is not intended to restrict this invention to these particular binders since they are shown only because they are typical of the water-insoluble, organic, film-forming materials which are capable of drying to a solid film and therefore are commonly used in coating finishes. Equally valuable compositions may be based on linseed oil, tung oil, soybean oil, fish oil, oleoresinous varnishes, modified urea formaldehyde resin varnishes, modified phenol formaldehyde resin varnishes, as well as other synthetic resins and cellulose derivatives. In practice, it is most common to use a combination of two or more film-forming materials, and it should be understood that various combinations of the above recited materials may comprise the film-forming ingredients of this invention. The colored pigments used in several examples are illustrative only, and any commonly used pigment may be used in conjunction with the ferric polyphosphate pigment.

The use of coating compositions containing ferric polyphosphates as essential pigmenting ingredients offers the following advantages to the paint formulator. It enables the formulation of clear varnishes and lacquers with a high degree of film durability as compared with that of the clear vehicle alone. These have special value in protecting chromium plated surfaces, sign paints and the like and can be used as clear finishes on wood. It enables other pigments, including aluminum powder, to be used at the optimum concentration for the desired decorative effect while the ferric polyphosphate can be added as needed for durability without serious change in color. In many cases, the use of ferric polyphosphate pigments results in a significant saving in the cost of the finish, since they can replace a substantial part of a more expensive pigment.

I claim:

1. A coating composition comprising an alkyd resin vehicle and 10 to 20% by weight, based on the alkyd resin, of a water-insoluble ferric polyphosphate pigment.

2. A coating composition comprising an oleo-resinous varnish and 10 to 20% by weight, based on the solids of said oleo-resinous varnish, of a water-insoluble ferric polyphosphate pigment.

References Cited in the file of this patent

UNITED STATES PATENTS

| | | |
|---|---|---|
| 2,371,866 | Barrett | Mar. 20, 1945 |
| 2,381,388 | Tann | Aug. 7, 1945 |
| 2,876,117 | Jackson | Mar. 3, 1959 |

FOREIGN PATENTS

| | | |
|---|---|---|
| 904,299 | France | Feb. 26, 1945 |
| 711,893 | Great Britain | July 14, 1954 |